United States Patent
Zhu et al.

(10) Patent No.: US 6,452,815 B1
(45) Date of Patent: Sep. 17, 2002

(54) ACCELERATED COMMUTATION FOR PASSIVE CLAMP ISOLATED BOOST CONVERTERS

(76) Inventors: Lizhi Zhu, 8225 Valley View Cir. Apt. 125C, Westland, MI (US) 48185; Jih-Sheng Lai, 2204 Hardwick St., Blacksburg, VA (US) 24060; Fred C. Lee, 2909 Stradford La., Blacksburg, VA (US) 24060

(*) Notice: Subject to any disclaimer, the term of this patent is extended or adjusted under 35 U.S.C. 154(b) by 0 days.

(21) Appl. No.: 09/865,099

(22) Filed: May 24, 2001

Related U.S. Application Data
(60) Provisional application No. 60/270,703, filed on Feb. 22, 2001.

(51) Int. Cl.[7] .............................................. H02M 3/335
(52) U.S. Cl. ..................... 363/17; 363/56.05; 363/56.02
(58) Field of Search .............................. 363/17, 24, 25, 363/26, 39, 40, 49, 56.02, 56.05, 56.06, 56.08, 98, 127, 132, 133; 361/91.7

(56) References Cited

U.S. PATENT DOCUMENTS

| | | | |
|---|---|---|---|
| 3,986,097 A | 10/1976 | Woods | 307/64 |
| 4,953,068 A | * 8/1990 | Henze | 363/17 |
| 5,745,351 A | 4/1998 | Taurand | 363/20 |
| 5,991,670 A | 11/1999 | Mufford et al. | 701/22 |
| 6,191,957 B1 | * 2/2001 | Peterson | 363/17 |

* cited by examiner

Primary Examiner—Jessica Han
(74) Attorney, Agent, or Firm—John M. Naber; Vincent E. Wiltse

(57) ABSTRACT

This invention is an efficient and cost effective bi-directional DC/DC converter that can effectively reduce the switch voltage stress (such as a semiconductor) with an accelerated commutation circuit, and thus allowing a low-cost passive clamp circuit to be used. Specifically, the invention is a method and system to accelerate commutation for passive-clamped isolated boost converters, which can also be a boost mode in a bi-directional DC/DC converter. A primary circuit has a snubber comprising a diode, a capacitor and an energy dissipater (such as a resistor or small buck converter). The primary circuit can be a "full bridge converter" or a "push-pull converter" or an "L-type converter" configuration. The commutation of the present invention protects the primary circuit switches from voltage spikes during switching conditions. The present invention can shorten a secondary circuit by turning on at least two switches on the secondary circuit simultaneously for a minimal calibratable period while primary circuit diagonal switches turn off. The present invention also has a means to allow a smooth transition between a choke current and a primary current. Primary current increases linearly through the snubber circuit during circuit startup, thus protecting the primary circuit controllers.

22 Claims, 10 Drawing Sheets

ACCELERATED COMMUTATION FOR PASSIVE CLAMP ISOLATED BOOST CONVERTERS

This application is the non-provisional application of provisional patent application No. 60/270,703 titled, "Accelerated Commutation for Passive Clamp Isolated Boost Converters," filed Feb. 22, 2001.

BACKGROUND OF THE INVENTION

1. Field of the Invention

The present invention relates generally to a DC/DC converter and specifically to a system and method to accelerate commutation for a passive clamp isolated boost for a bi-directional DC/DC converter.

2. Discussion of the Prior Art

The need to reduce fossil fuel consumption and emissions in automobiles and other vehicles predominately powered by internal combustion engines (ICEs) is well known. Vehicles powered by electric motors attempt to address these needs.

Typically, a vehicle propelled by an electric motor can use batteries or fuel cells to generate the necessary current. Fuel cells generate electrical power through an electrochemical reaction of a fuel and oxidant, such as hydrogen and oxygen. Water is the product of the electrochemical reaction in a fuel cell utilizing hydrogen and oxygen, a product that is easily disposed. See generally, U.S. Pat. No. 5,991,670 to Mufford.

The desirability of using electric motors to propel a vehicle is clear. There is great potential for reducing vehicle fuel consumption and emissions with no appreciable loss of vehicle performance or drive-ability. Nevertheless, new ways must be developed to optimize these potential benefits.

One such area of electric vehicle (EV) development is converting direct current (DC) generating devices such as fuel cells and high voltage (HV) batteries to their appropriate load. Ideally, the current generators (such as HV batteries or fuel cells) and loads (such as vehicle 12 V powered accessories) would all be at the same voltage level. Unfortunately, this is not presently the case. For example, a conventional 12 V voltage system is still needed in an electric vehicle to power conventional 12 V loads such as lights, sensors and controllers, while a high voltage bus (for example 300 V) feeds the traction inverter and motor. There is a dual-voltage power system in the electric vehicle and energy needs to be transferred bi-directionally between the two voltage systems.

Therefore, a successful implementation of electric traction motor propelled vehicles requires an effective bi-directional DC/DC converter. The converter must be bi-directional because the high voltage bus can be used as a current load during start-up or as a current generator. Similarly, the 12 V battery can be used as a current generator or as a load while charging. DC/DC converters are certainly known in the prior art. Even bi-directional DC/DC converters are known. See generally, U.S. Pat. No. 5,745,351 to Taurand and U.S. Pat. No. 3,986,097 to Woods.

In a bi-directional DC/DC converter, one side, the primary side, of the transformer can be current-fed and the other side, the secondary side, can be voltage-fed. It is well known in the prior art that the primary side normally experiences a high voltage overshoot during a diagonal switch-pair turn-off condition. This voltage spike needs to be clamped to avoid a voltage overshoot passing through the switching devices. A passive clamp converter employs a diode and a capacitor to absorb excessive energy from the voltage overshoot and a resistor to dissipate the absorbed energy. Unfortunately, the use of a simple prior art passive-clamped snubber results in severe limitation in a low voltage (12 V), high current (e.g., hundreds of amperes) application due to significant power loss, although it is a simple approach widely used by industry to resolve the voltage spike issue.

An active clamp in the prior art replaces the resistor in the passive clamp circuit with a switch to pump back the energy to the source when the capacitor is not absorbing energy. This recycles the dissipated energy and improves efficiency, but this technology is expensive to implement.

In the prior art, bi-directional flyback converters are known to be best suited for low power applications. Any automobile DC/DC converter must be able to withstand the extreme environmental conditions and higher power requirements experienced by many vehicles. Therefore, there is a desire and a need for an efficient and cost effective high power bi-directional DC/DC converter.

SUMMARY OF THE INVENTION

Accordingly, an object of the present invention is to provide an efficient and cost effective high power bi-directional DC/DC converter that can withstand the vigorous environment of an automobile.

The invention is a method and system to accelerate commutation for passive-clamped isolated high power boost converters comprising a primary circuit having at least one pair of diagonal controllers (such as switches or diodes); a secondary circuit comprising at least two controllers (such as switches or diodes); a one directional or bi-directional transformer connected to the primary circuit and the secondary circuit; and the primary circuit also having a snubber comprising a clamping diode, a clamping capacitor and an energy dissipater (such as a resistor or small buck converter). The clamping diode can include "push-pull" and "L" configurations. The commutation of the present invention protects the primary circuit switches from voltage spikes in a boost mode.

The present invention shorts the secondary circuit with a method and system to turn on at least two switches in the secondary circuit simultaneously for a minimal calibratable period (for example, 2 microseconds) while primary circuit diagonal switches turn off, whereby the primary circuit current can be transferred to the secondary circuit quickly and reduce a voltage spike due to primary current and transformer leakage interaction.

The present invention also has a means to allow a smooth transition between a choke (inductor) current and a transformer primary current. Primary current increases linearly through the snubber circuit during switching conditions, thus protecting the primary circuit controllers.

Other objects of the present invention will become more apparent to persons having ordinary skill in the art to which the present invention pertains from the following description taken in conjunction with the accompanying figures.

BRIEF DESCRIPTION OF THE FIGURES

The foregoing objects, advantages, and features, as well as other objects and advantages, will become apparent with reference to the description and figures below, in which like numerals represent like elements and in which.

DETAILED DESCRIPTION OF THE PREFERRED EMBODIMENT

Figure 1:
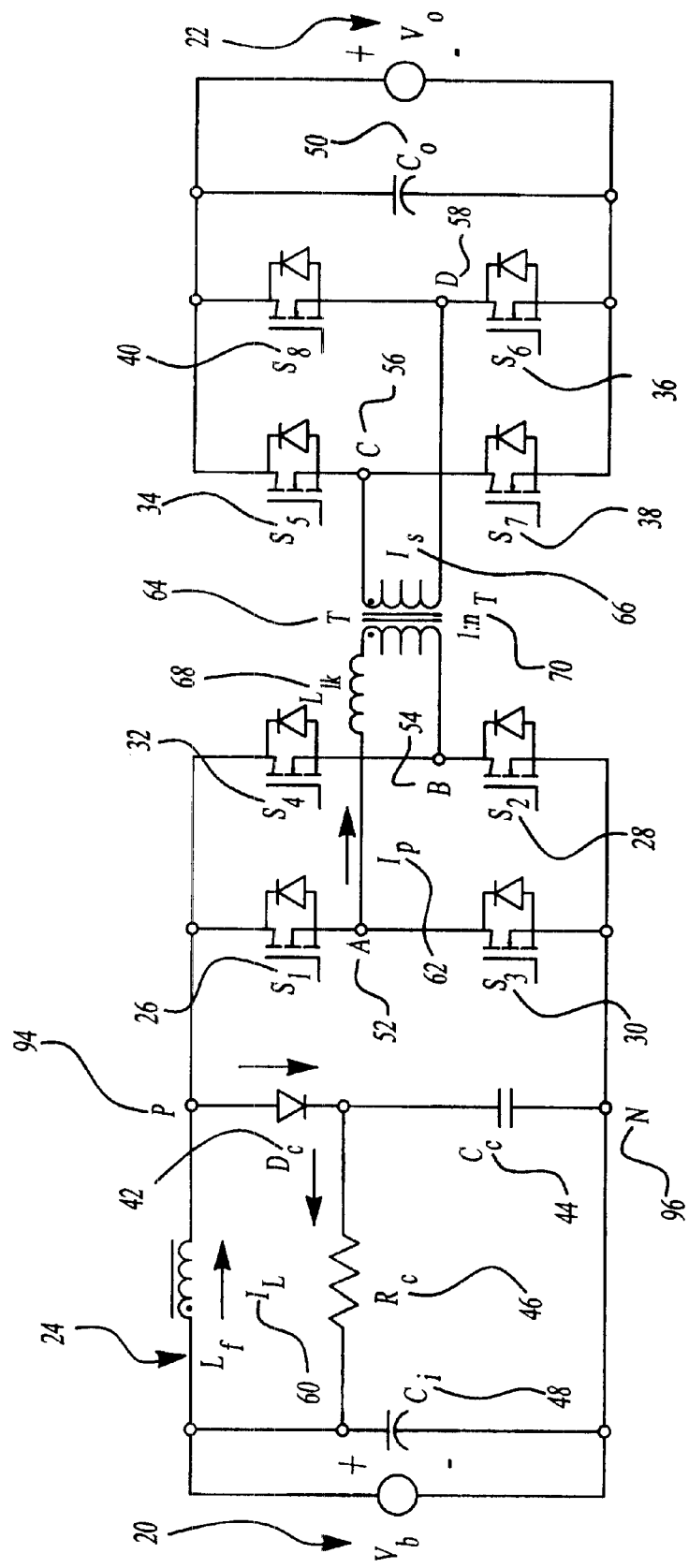
FIG. 1 illustrates a bi-directional full-bridge DC/DC converter with Accelerated Commutation for Passive Clamping (ACPC)

The present invention relates generally to a DC/DC converter and specifically to a system and method to accelerate commutation for a passive clamp isolated boost for a high power bi-directional DC/DC converter. For the present application, high power could be defined as greater than 1 kW power.

Generally, the operation of inductive storing converters is based on energy transfer cycles. This includes a period of accumulation of magnetic energy in an inductive device (such as an inductor or transformer) through a circuit, followed by a period of restitution of this energy in a load (such as a typical 12 V load in a car) through another circuit.

The present invention relates in particular to a DC/DC converter. This converter can be bi-directional and transforms energy from primary to secondary circuits and from the secondary to primary circuits through a transformer. The primary circuit comprises at least one pair of switches and the secondary circuit has at least two pairs of diagonal switches. The converter of the present invention is particularly adapted to function like an electronic "starter/alternator" for an electric vehicle (EV) although several other types of applications are possible. The present invention can boost voltage up from a 12 V battery to a high voltage to start up a fuel cell powered EV, and then can convert the voltage down from a high-voltage bus to a low-voltage bus to supply 12 V loads and charge the battery. The present invention uses a special control method and system to accelerate transformer current transfer from one circuit to the other circuit during switching conditions.

In a bi-directional DC/DC converter, one side of the transformer can be current-fed (for example, having high current to feed the battery). This is the primary side. The other side, the secondary side, can be voltage-fed. The energy can be transferred bi-directionally between the primary side and secondary side.

The present invention is an improvement over the prior art. Due to the existence of leakage inductance of an isolated transformer in a current-fed isolated DC/DC converter, the current passing through a choke, which is an inductor between a DC source and the switches, generates a high voltage spike across the switching device. This high voltage spike can damage the circuit during switching conditions. Specifically, the primary side normally experiences a high voltage overshoot during a diagonal switch-pair turn-off condition. This overshoot is simply the multiplication of the inductance and the rate of the current. To protect the circuitry, this voltage spike needs to be clamped (or damped) to avoid a high switch voltage rating for the circuits. The high switch voltage rating makes the circuitry much more expensive since the circuitry must be able to withstand the voltage spike.

The control method and system of the present invention can reduce the clamping energy to the clamp circuit, thus reducing the voltage spike. This allows the use of less expensive low switch voltage rating circuitry.

Clamping can usually be characterized in the art as a passive clamp or an active clamp. Usually, a normal passive clamping circuit, having a diode, a capacitor and a resistor, results in very low efficiency. In an alternative active-clamp current-fed isolated DC/DC converter, the root-mean-square (RMS) current going through the clamping switch is very Ad high. Active clamping requires more parallel devices for the active clamp switch and very good capacitors for the active capacitor to handle such a high RMS current, adding to the expense of the circuitry.

Therefore, to obtain cost effective clamping circuitry of the bi-directional DC/DC converter, the present invention has an accelerated commutation using passive clamping (ACPC). The present invention provides better efficiency than the normal passive clamping circuit, but at lower cost than the active clamping circuit. Although the preferred embodiment of the present invention is targeted for vehicles propelled by electric traction motors, it could be used for any type of DC/DC conversion such as one directional or bi-directional. By way of example, possible applications can include bi-directional charging between fuel cell and battery or bi-directional charging between low voltage battery and high voltage battery.

The present invention is best understood using the variables as defined below:

| Symbol | Definition |
|---|---|
| C | capacitor |
| V | voltage |
| R | resistance |
| ACPC | accelerated commutation for passive clamping |
| $V_b$ | low voltage source side |
| $V_o$ | high voltage source side |
| $V_o$ to $V_b$ | buck-mode |
| $V_b$ to $V_o$ | boost-mode |
| L | choke or inductor arranged on the $V_b$ side |
| S1, S2, S3, S4 | switches that act as an inverter bridge ($V_b$ to $V_o$ in boost-mode) and a rectifier bridge ($V_o$ to $V_b$ in buck mode) |
| S5, S6, S7, S8 | switches that act as a rectifier bridge ($V_b$ to $V_o$ in boost-mode) and an inverter bridge ($V_o$ to $V_b$ in buck-mode) |
| Dc-Cc-Rc | passive snubber designed for boost-mode |
| $I_L$ | inductor current |
| $L_{lk}$ | transformer leakage inductance |
| $I_p$ | Transformer primary current |
| Cc | snubber clamping capacitor |
| $I_s$ | transformer secondary current |
| $R_c$ | snubber resistor |
| $D_c$ | clamping diode |
| $C_i$ | input filter capacitor |
| N | negative node |
| P | positive node |
| A | node A |
| B | node B |
| C | node C |
| D | node D |
| T | main transformer |
| $n_T$ | number of turns |
| $C_o$ | output filter capacitor |
| $T_s$ | high frequency switching period |

The method and system of the present invention can accelerate the circuit by shorting the secondary side of the transformer and route switch voltage spikes to a snubber on the primary side. Generally, the method and system of the present invention is to turn on two bottom switches on the secondary circuit (see Switches S6 36 and S7 38 in FIG. 1) simultaneously for a minimal calibratable period (for example, 2 micro-seconds) when the primary diagonal switches turn off. Thus, at least one pair of diagonal primary circuit switches are bypassed during switching. conditions. This switching condition transfers primary current to secondary current very quickly since the whole voltage just applies to the leakage inductance of the transformer. Further, the voltage spike due to primary current and transformer leakage interaction can be largely reduced.

To illustrate the preferred embodiment of the invention, FIG. 1 shows a bi-directional full-bridge DC/DC converter with accelerated commutation for passive clamping (ACPC). As shown in FIG. 1, full-bridge in the primary side has Switches S1 26, S2 28, S3 30, and S4 32. The switches in the overall circuit can be semiconductors and may also have anti-paralleled diodes that are well known in the prior art. In the secondary side, the full-bridge has Switches S5 34, S6 36, S7 38, and S8 40. A $V_b$ 20 represents a low voltage current source such as a battery, while a $V_o$ 22 represents a high voltage current source such as a generator. It should be noted that in all the circuit figures for the present invention the arrows represent the flow of current based on the status of the switches or controllers for that time interval. The dashed lines (124) in each figure represent the branch is switched off in that interval and does not carry any current. The present invention not only provides bi-directional DC/DC power flow control between the $V_b$ 20 and $V_o$ 22, but also isolates the $V_b$ 20 and $V_o$ 22 sources by a transformer (T) 64. A choke ($L_f$) 24 is positioned on the low voltage side ($V_b$ 20 side). When power is delivered from $V_b$ 20 to $V_o$ 22, it is called "boost-mode." Switches S1 26, S2 28, S3 30,and S4 32 act as an inverter bridge, and Switches S5 34, S6 36,S7 38, and S8 40 act as a rectifier bridge. The inverter bridge inverts a DC/DC voltage to an AC voltage, and the rectifier acts in reverse. Although switches are illustrated for the preferred embodiment, diodes or other types of controllers known in the prior art could also be used. Power delivered from $V_o$ 22 to $V_b$ 20 is called "buck-mode." In "buck-mode," Switches S5 34, S6 36, S7 38, and S8 40 act as the inverter bridge, and switches S1 26, S2 28, S3 30, and S4 32 act as the rectifier bridge. The primary circuit also has a clamping diode (Dc) 42, a snubber (clamping) capacitor (Cc) 44, and an energy dissipater such as a resistor (Rc) 46. The Dc 42-Cc 44-Rc 46 combine to form a passive snubber (also known as a damper) and designed to be most effective in the boost-mode. The effect of the snubber can be referred to as "snubbing." When the voltage spike occurs during the inverter bridge transition, the passive circuit absorbs the energy and clamps the voltage to a lower value.

Additionally, the circuit has an Input Capacitor ($C_i$) 48, an output capacitor ($C_o$) 50, a Node A (A) 52, a Node B (B) 54, a Node C (C) 56, a Node D (D) 58, a choke current through inductor ($I_L$) 60, primary current ($I_p$) 62, the transformer (T) 64, a Transformer Secondary Current ($I_s$) 66, Transformer Leakage Inductance ($L_{IK}$) 68, and the Ratio of Transformer Wire Turns $1:n_t$ 70.

Figure 2:
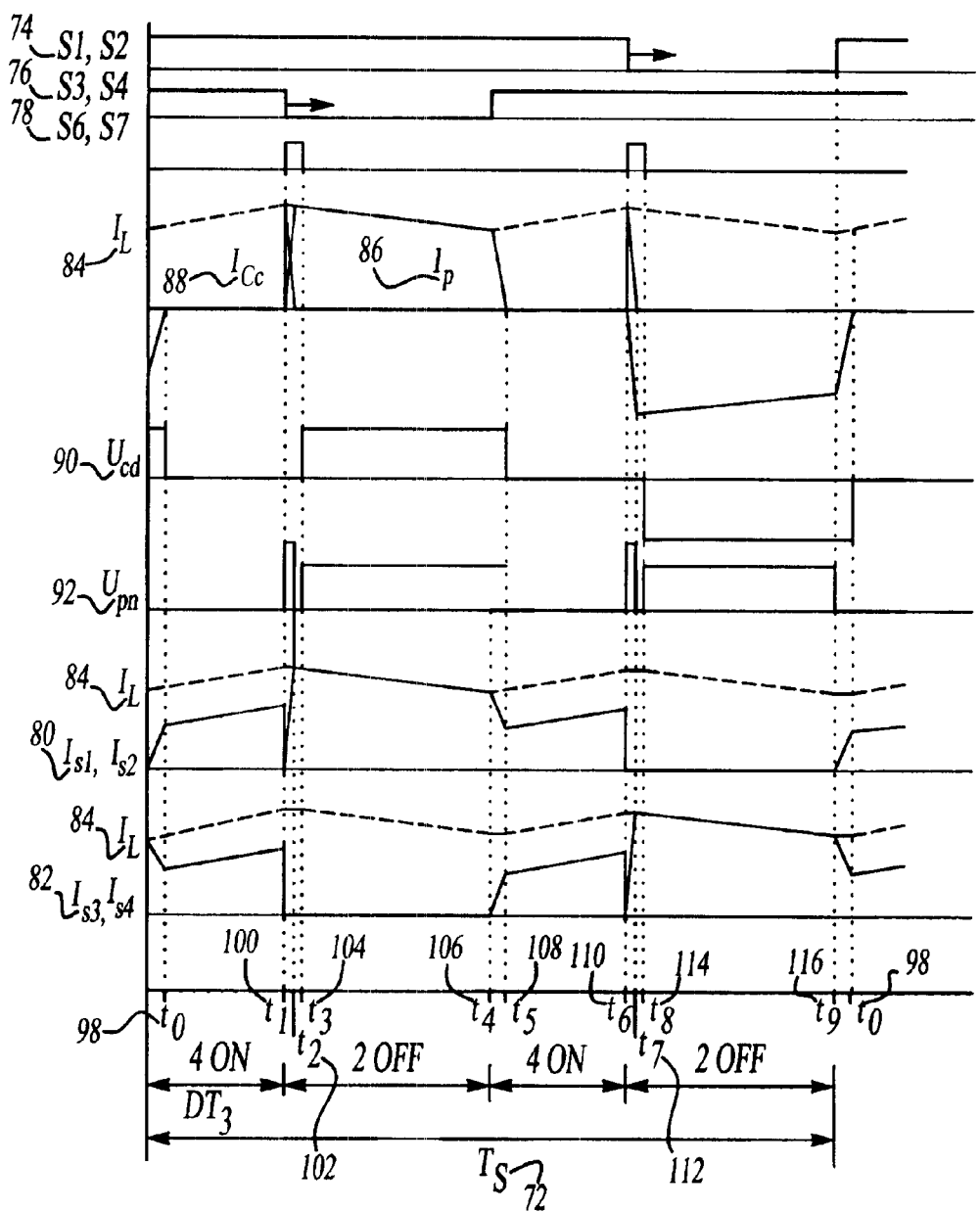
FIG. 2 illustrates a Timing diagram of the proposed converter.

FIG. 2 illustrates the timing waveform diagram for the circuit illustrated in FIG. 1 during time interval $T_s$ 72. As shown in FIG. 2, the status of various switches during the $T_s$ 72 is represented by "S1, S2" 74, "S3, S4" 76, and "S6, S7" 78. When the switch is "on," a line is drawn above a base line. "$I_{S1}, I_{S2}$" 80 shows the current during the $T_s$ 72 for switches S1 26 and S2 28 respectively. "$I_{S3}, I_{S4}$" 82 shows the current during the $T_s$ 72 for switches S3 30 and S4 32 respectively. An $I_L$ 84 is the current through the inductor for the corresponding interval. An $I_p$ 86 is the current through the primary side of the T 64, $I_{Cc}$ 88 is the current through the snubber circuit (Dc 42-Cc 44-Rc 46). A $U_{pn}$ 92 represents the voltage between a Positive Node (P) 94 and a Negative Node (N) 96 respectively. The timing waveform diagram is best understood dividing time interval $T_s$ 72 into subintervals to 98, $t_1$ 100, $t_2$ 102, $t_3$ 104, $t_4$ 106, $t_5$ 108, $t_6$ 110, $t_7$ 112, $t_8$ 114, and $t_9$ 116.

Figure 3:
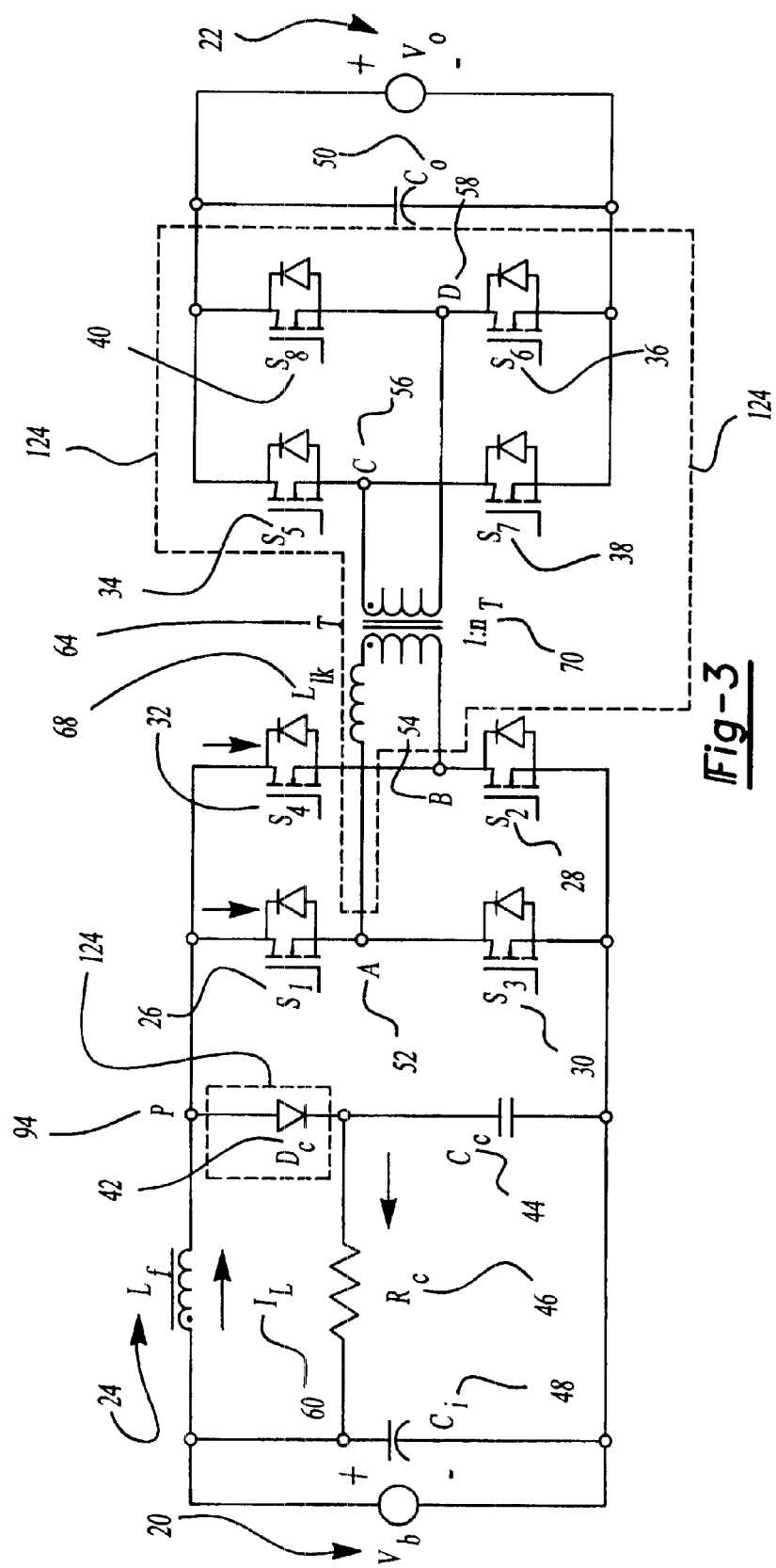
FIG. 3 illustrates a [t0, t1] Interval.

During the [$t_0$ 98, $t_1$ 100] interval illustrated in FIG. 3, Switches S1 26, S2 28, S3 30, and S4 32, are turned on. Switches S5 34, S6 36, S7 38, and S8 40, are turned off. $L_f$ 24 is charged by $V_b$ 20 and the $I_L$ 60 increases linearly.

Figure 4:
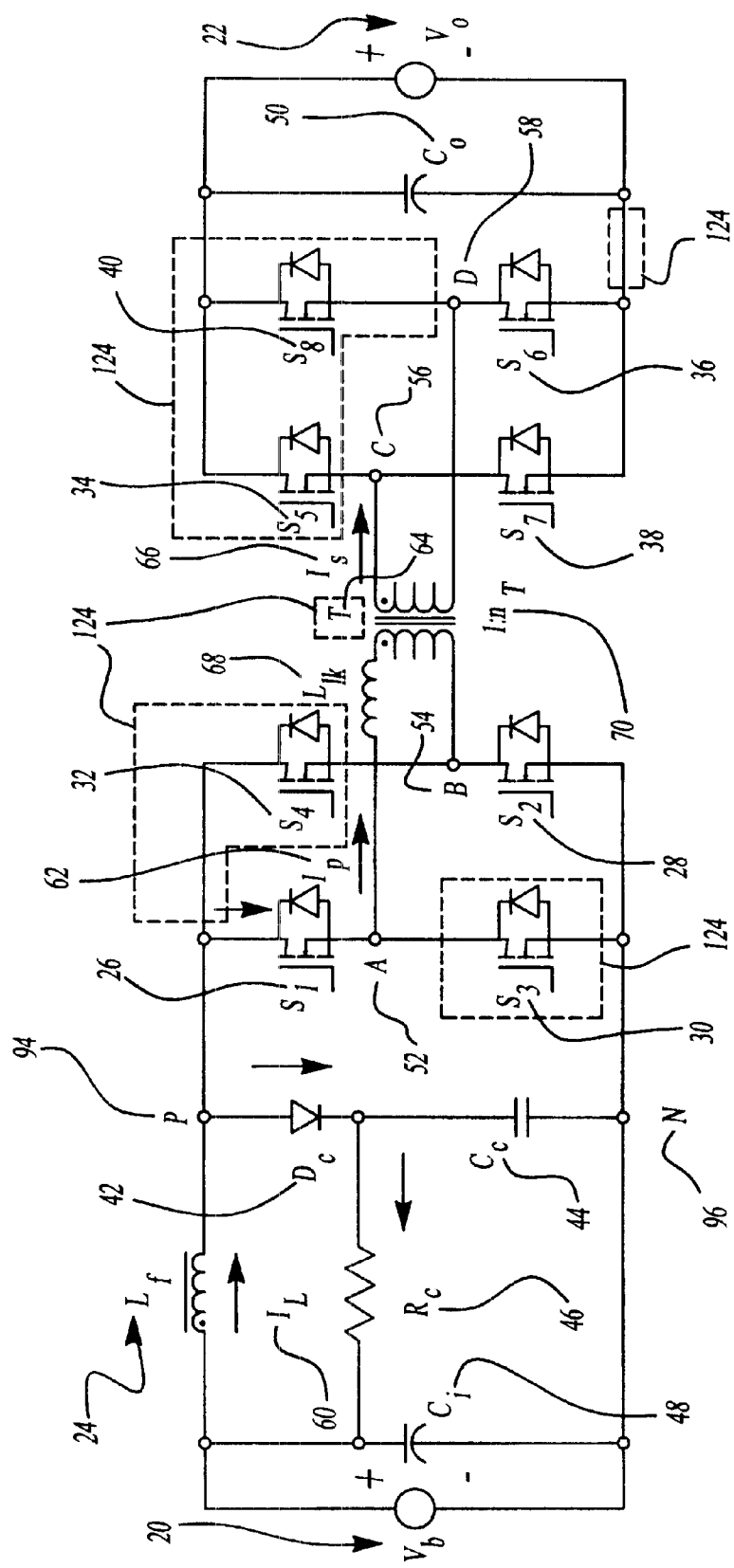
FIG. 4 illustrates a [t1, t2] Interval.

During the [$t_1$ 100, $t_2$ 102] interval illustrated in FIG. 4, Switches S3 30 and S4 32 are turned off to illustrate a diagonal switch shutoff. It is during this switching condition time interval that the voltage spike is normally experienced. Also during the [$t_1$ 100, $t_2$ 102] interval, S6 36 and S7 38 are turned on, shorting the secondary side of the transformer T 64. Due to the existence of a $L_{lk}$ 68, the $I_p$ 62 cannot instantly change to $I_L$ 60. Therefore, $I_p$ 62 increases linearly to $I_L$ 60 while the current through the snubber circuit (Dc 42-Cc 44-Rc 46) $I_{cc}$ 88 linearly decreases to zero. During the [$t_1$ 100, $t_2$ 102] interval, the difference in current between $I_L$ 60 and $I_p$ 62 goes into $C_c$ 44, avoiding the high voltage spike across the P node 94 and N node 96 bus. Using the design of the present invention, the Dc 42-Cc 44-Rc 46 snubber circuit protects Switches Si 26, S2 28, S3 30, and S4 32 during this interval. It does this properly not only by turning off switches on the primary side, but also by providing a means for a smooth transition between $I_L$ 60 to $I_p$ 62 via the snubber circuit (switching condition). The switches are turned off for the minimal calibratable time in this embodiment and could, by way of example, be 2 microseconds.

Figure 5:
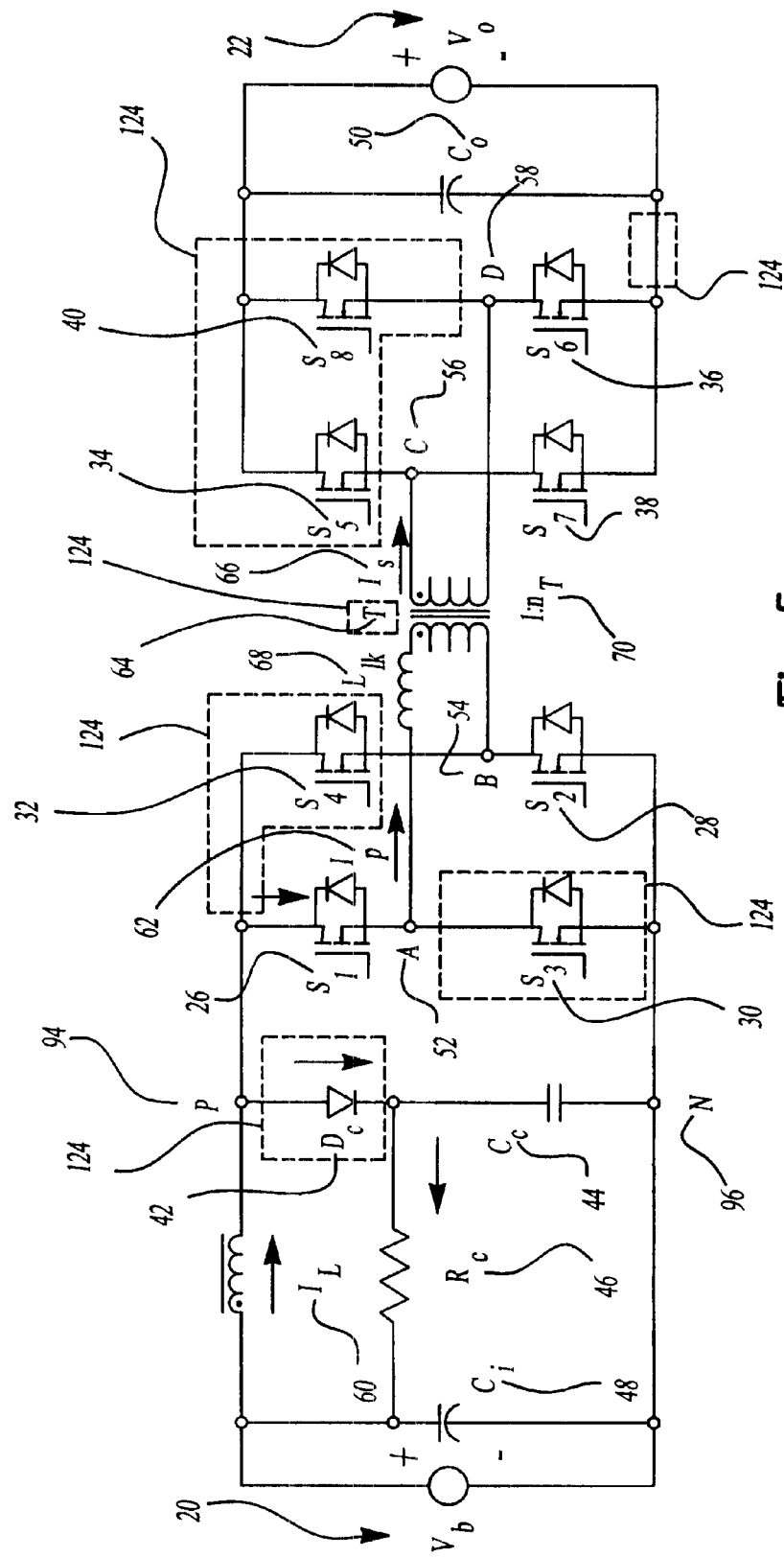
FIG. 5 illustrates a [t2, t3] Interval.

Next, at time interval [$t_2$ 102, $t_3$ 104] illustrated in FIG. 5, Switches S6 36 and S7 38 remain "on," thus the secondary side of the T 64 remains shorted. During this interval, $I_P$ 62 equals $I_L$ 60 and $U_{PN}$ 92 is inverted.

Figure 6:
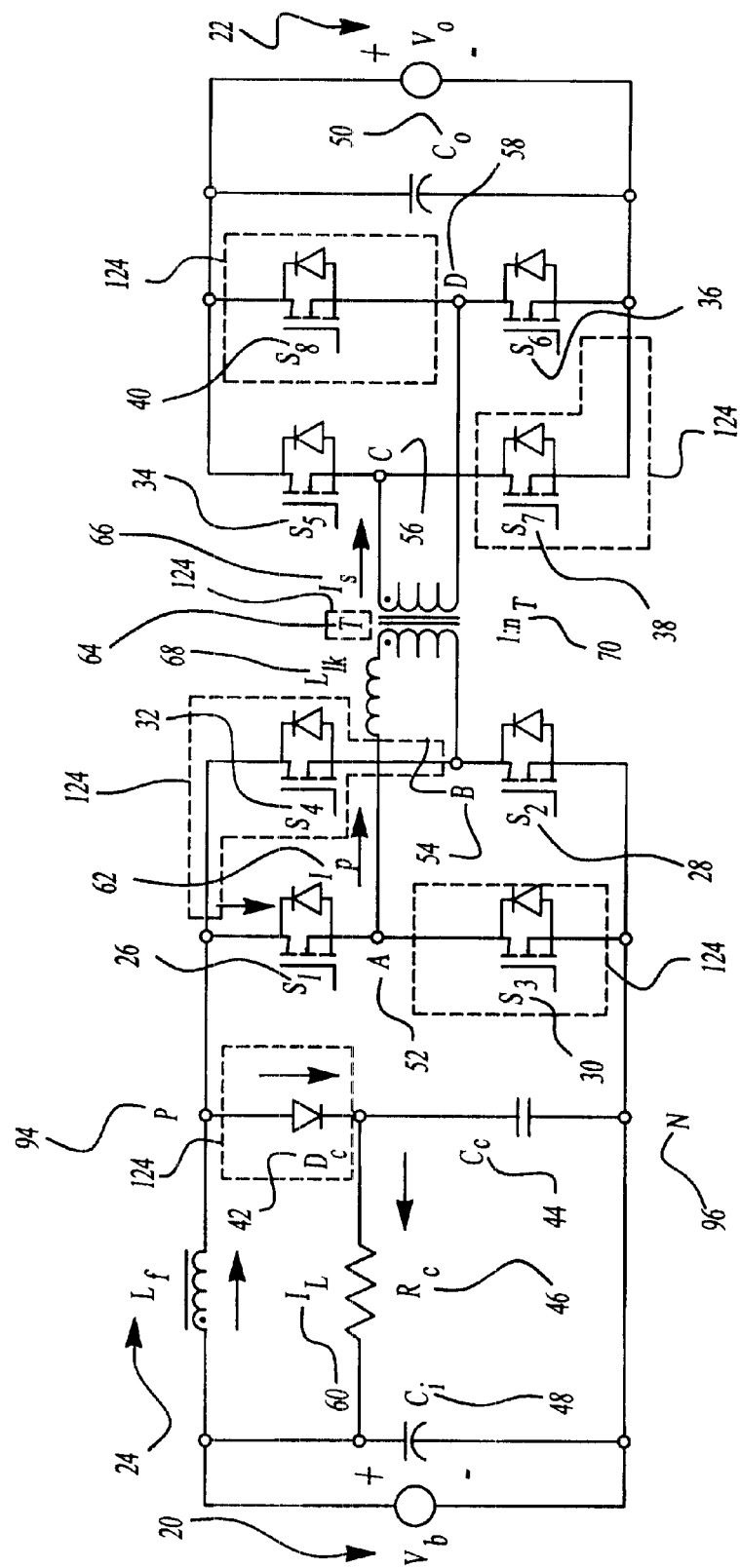
FIG. 6 illustrates a [t3, t4] Interval.

Next, time interval [$t_3$ 104, $t_4$ 106] illustrated in FIG. 6 is an energy transferring interval. Here, switches S7 38 in and S8 40 are turned off at time $t_3$ 104.Then $I_S$ 66 goes through body diode Switches S5 34 and S6 36, delivering energy from the primary side to the secondary side, (i.e., "boost-mode").

Figure 7:
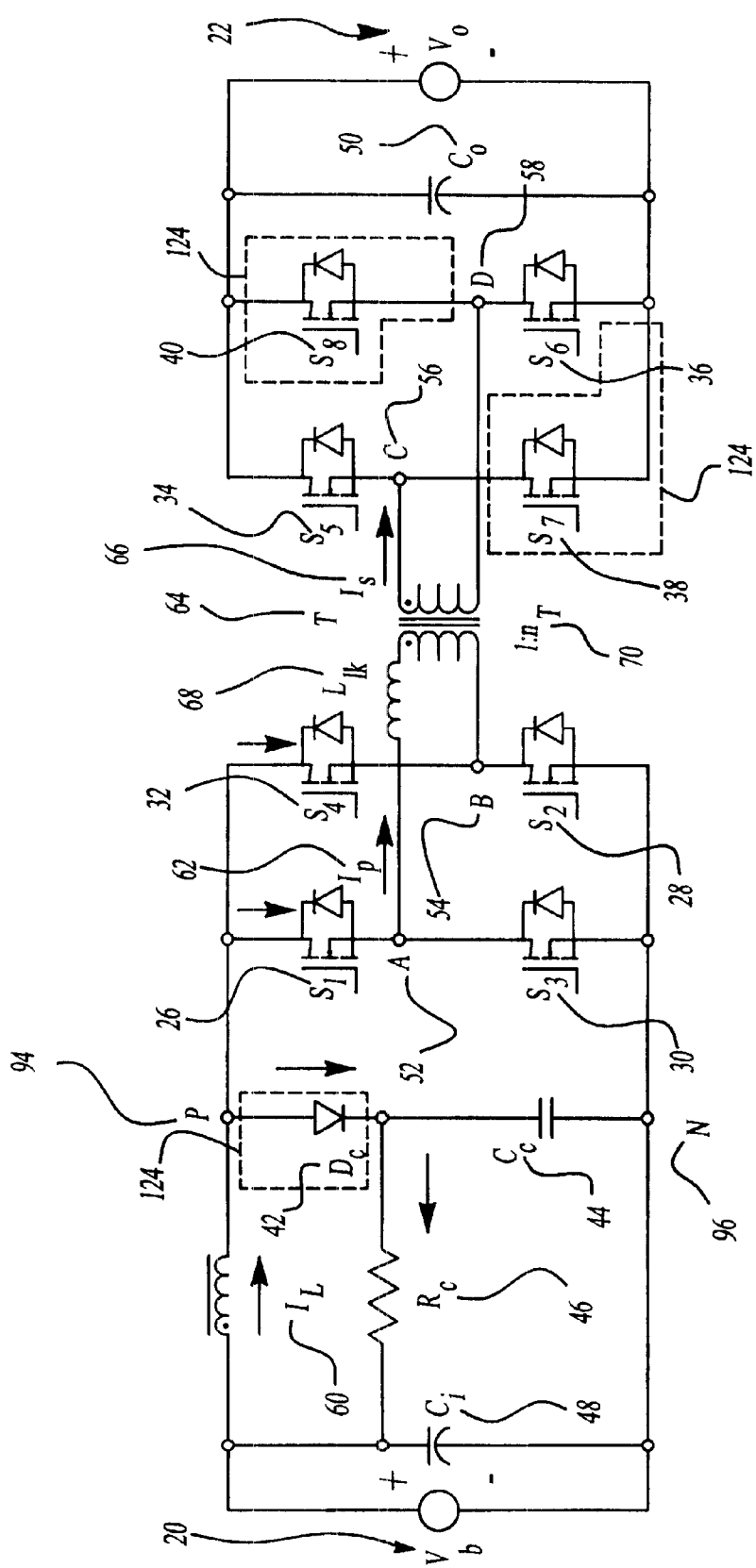
FIG. 7 illustrates a [t4, t5] Interval.

At time $t_4$ 106, during time interval [$t_4$ 106, $t_5$ 108] illustrated in FIG. 7, switches S3 30 and S4 32 are switched "on." The circuit of the primary side of the T 64 is shorted again to store energy to the $L_f$ 24. Consequently, $I_L$ increases linearly. Due to the reflected voltage $V_o$ 22 applies on $L_{lk}$ 68, the $I_p$ 62 is reset to zero.

Figure 8:
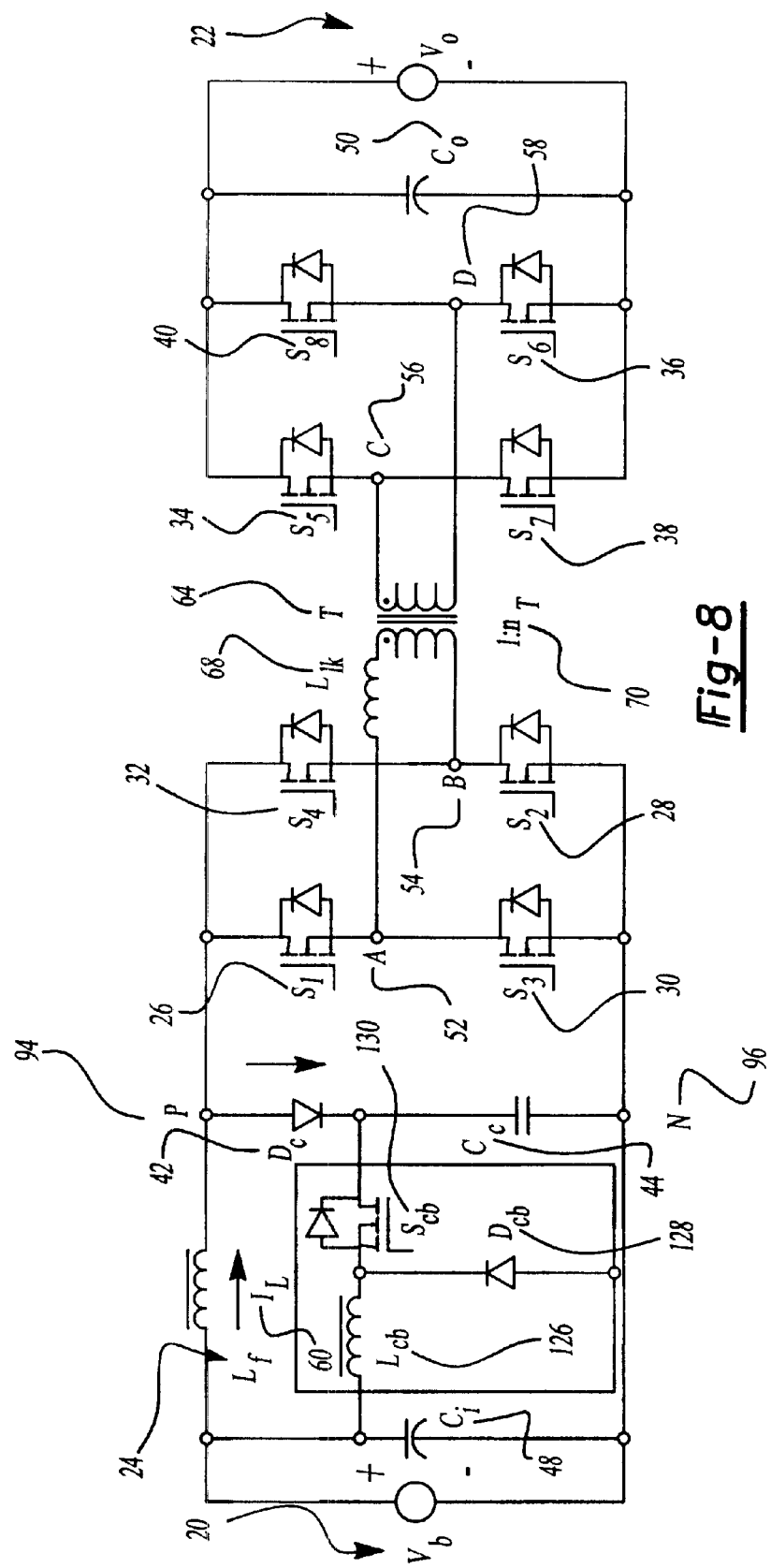
FIG. 8 illustrates an alternative embodiment using a small buck converter instead of a clamping resistor (Rc)

As shown in FIG. 1, partial energy in $C_c$ 44 is dissipated on the $R_c$ 46. This causes some loss of energy and thus can lower overall circuit efficiency. As an alternate embodiment of the present invention, FIG. 8 illustrates a small "buck" converter 118 replacing the $R_c$ 46 to recycle the power in the snubber circuit back to the source if efficiency is a concern. The small "buck" converter" having a Lcb 126 (inductor filter), Scb 128 (active switch), and Dcb 130 (rectifier diode).

Figure 9:
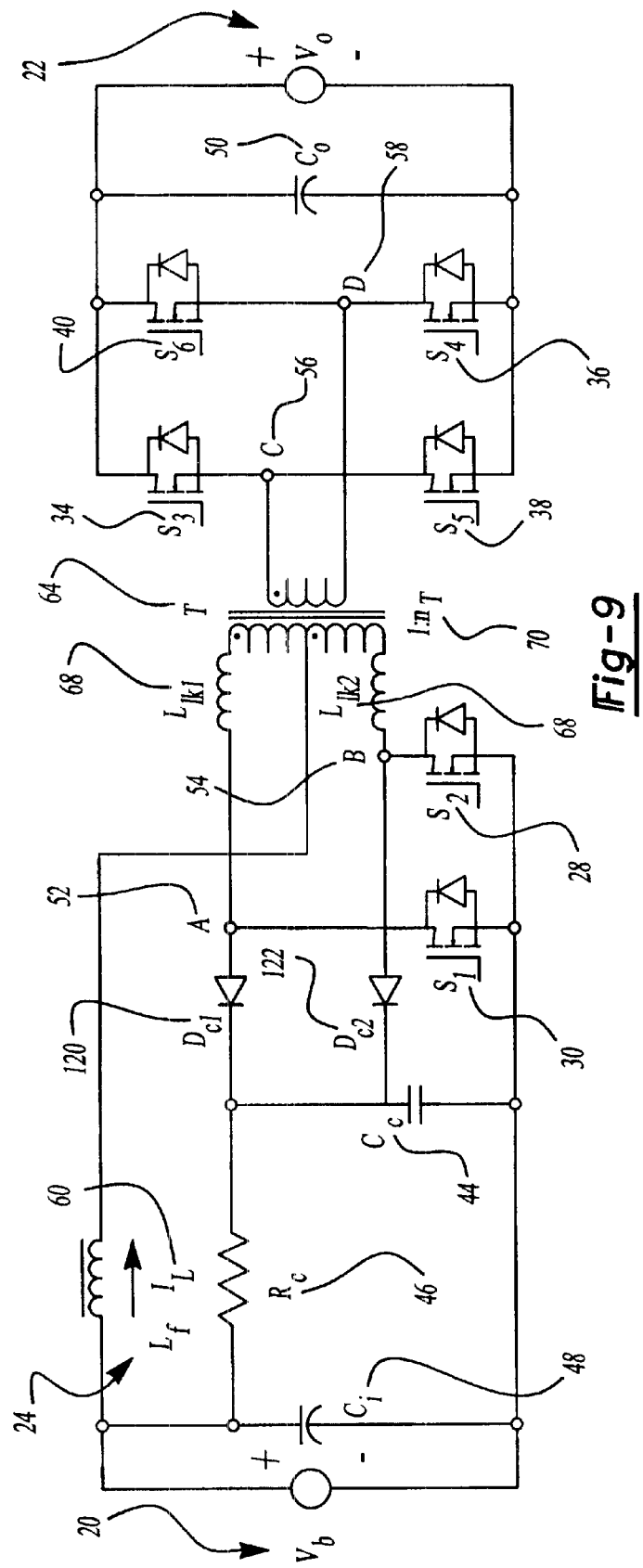
FIG. 9 illustrates a Push-pull Converter with Accelerated Commutation for Passive Clamping (ACPC)
Figure 10:
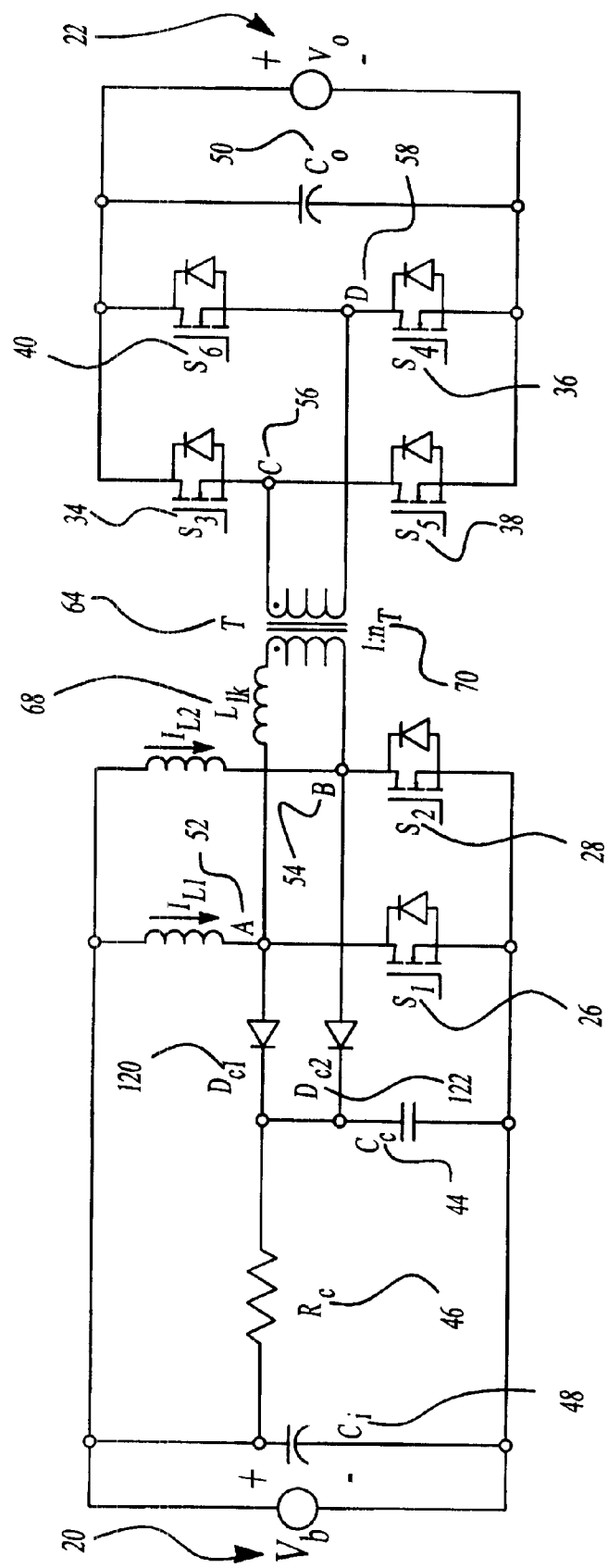
FIG. 10 illustrates an L-type Converter with Accelerated Commutation for Passive Clamping (ACPC).

Other alternate embodiments using different types of converters are also possible. FIG. 9 illustrates a variation using a "push-pull" converter with Accelerated Commutation for Passive Clamping (ACPC). Here the choke diode $D_c$ 42 is replaced with a "push-pull" configuration known in the prior art using $D_{c1}$ 120 and $D_{c2}$ 122. FIG. 10 illustrates yet another embodiment using an L-type Converter with Accelerated Commutation for Passive Clamping (ACPC). Here, the choke diode $D_c$ 42 is replaced with a "L-type" configuration known in the prior art using $D_{c1}$ 120 and $D_{c2}$ 122. The push-pull and L-type configurations, which have a different number of inductors and switches in the primary side, offer more choices for different power and voltage applications.

The above-described embodiments of the invention are provided purely for purposes of example. Many other variations, modifications, and applications of the invention may be made.

We claim:

1. A system to accelerate commutation for passive-clamped isolated boost converters comprising:
   a current source;
   a primary circuit comprising at least one pair of switches;
   a secondary circuit comprising at least two pairs of diagonal switches;
   a transformer connected to the primary circuit and the secondary circuit; and
   the primary circuit further comprising a snubber comprising a diode, a capacitor and an energy dissipater, whereby the primary circuit switches are protected from voltage spikes during switching conditions.

2. The system of claim 1 wherein the switches are semiconductor switches.

3. The system of claim 1 wherein the switches comprise anti-paralleled diodes.

4. The system of claim 1 wherein the energy dissipater is a resistor.

5. The system of claim 1 wherein the energy dissipater is a small buck converter.

6. The system of claim 1 wherein the primary circuit is in a full-bridge configuration.

7. The system of claim 1 wherein the primary circuit is in a push-pull configuration.

8. The system of claim 1 wherein the primary circuit is in an L-type configuration.

9. The system of claim 1 wherein the primary circuit is accelerated by a system to shorten the secondary circuit of the transformer and switching voltage spikes are routed into the snubber on the primary circuit.

10. The system of claim 9 wherein the system to short the secondary circuit comprises a system to turn on at least two bottom switches on the secondary circuit simultaneously for a minimal calibratable period while primary circuit diagonal switches turn off, whereby the primary circuit current can be transferred to the secondary circuit quickly and reduce a voltage spike due to primary current and transformer leakage interaction.

11. The system of claim 1 wherein the system is one directional.

12. The system of claim 1 wherein the system is bi-directional.

13. The system of claim 1 wherein the snubber further comprises a means to allow a smooth transition between a choke current and a primary current.

14. A method for accelerating commutation for passive clamp isolated boost converter circuit comprised of a transformer connected to a primary circuit, and a secondary circuit, comprising the steps of:
   bypassing at least one pair of diagonal primary circuit switches during switching;
   shorting the secondary circuit; and
   snubbing the primary circuit using a diode, a capacitor and a means for dissipating energy, whereby primary circuit switches are protected from voltage spikes in a switching condition.

15. The method of claim 14 wherein the switches are semiconductor switches.

16. The method of claim 14 wherein the switches comprise anti-paralleled diodes.

17. The method of claim 14 wherein the means for dissipating energy uses a resistor.

18. The method of claim 14 wherein the means for dissipating energy uses a small buck converter.

19. The method of claim 14 wherein the step of shortening the secondary circuit comprises the step of turning on at least two switches on the secondary circuit simultaneously for a minimal calibratable period.

20. The method of claim 14 wherein the method is one directional.

21. The method of claim 14 wherein the system is bi-directional.

22. The method of claim 14 wherein snubbing the primary circuit further comprises the step of allowing a smooth transition between a choke current and a primary current.

* * * * *